US012561784B2

(12) United States Patent
Wang

(10) Patent No.: US 12,561,784 B2
(45) Date of Patent: Feb. 24, 2026

(54) DEFECT DETECTION METHOD AND DEVICE FOR AN LCD SCREEN

(71) Applicant: GOERTEK INC., Shandong (CN)

(72) Inventor: Xiaoman Wang, Shandong (CN)

(73) Assignee: GOERTEK INC., Shandong (CN)

( * ) Notice: Subject to any disclaimer, the term of this patent is extended or adjusted under 35 U.S.C. 154(b) by 385 days.

(21) Appl. No.: 18/042,422

(22) PCT Filed: Aug. 25, 2021

(86) PCT No.: PCT/CN2021/114450
§ 371 (c)(1),
(2) Date: Feb. 21, 2023

(87) PCT Pub. No.: WO2022/042579
PCT Pub. Date: Mar. 3, 2022

(65) Prior Publication Data
US 2023/0326006 A1     Oct. 12, 2023

(30) Foreign Application Priority Data
Aug. 28, 2020     (CN) ......................... 202010882209.0

(51) Int. Cl.
*G06T 7/00*          (2017.01)
*G06F 18/23*         (2023.01)
(Continued)

(52) U.S. Cl.
CPC ............ *G06T 7/0004* (2013.01); *G06F 18/23* (2023.01); *G06T 5/70* (2024.01); *G06T 7/11* (2017.01);
(Continued)

(58) Field of Classification Search
None
See application file for complete search history.

(56) References Cited

U.S. PATENT DOCUMENTS 5,917,934  A  *   6/1999   Chiu ...................... G06T 7/0006
                                                          348/125
6,868,175  B1 *   3/2005   Yamamoto .............. G06T 7/001
                                                          382/145
(Continued)

FOREIGN PATENT DOCUMENTS

CN          103413288  A      11/2013
CN          108280822  A      7/2018
(Continued)

*Primary Examiner* — Randolph I Chu
(74) *Attorney, Agent, or Firm* — Ingrassia Fisher & Lorenz, LLP

(57)          ABSTRACT

A defect detection method for an LCD screen includes acquiring a screen image of the LCD screen, performing a rough search for defects in the screen image to extract a suspected area where the defects are located, (based on the suspected area) clustering every pixel point in the suspected area to obtain clustering results, and each clustering result corresponds to a suspected defect, and (according to the clustering result) calculating a width and length of the suspected defect corresponding to the clustering result, and determining whether the suspected defect is a screen defect and which type of screen defect it belongs to based on the width and length of the suspected defect. The technical solution of the present disclosure realizes automatic detection of screen defects by rough positioning and accurate positioning of suspected defects, and the detection results are accurate and reliable.

8 Claims, 4 Drawing Sheets

(51) Int. Cl.

| | | |
|---|---|---|
| *G06T 5/70* | | (2024.01) |
| *G06T 7/11* | | (2017.01) |
| *G06T 7/13* | | (2017.01) |
| *G06T 7/136* | | (2017.01) |
| *G06T 7/60* | | (2017.01) |
| *G06T 7/73* | | (2017.01) |

(52) U.S. Cl.

CPC ............... *G06T 7/13* (2017.01); *G06T 7/136* (2017.01); *G06T 7/60* (2013.01); *G06T 7/73* (2017.01); *G06T 2207/20224* (2013.01); *G06T 2207/30121* (2013.01)

(56) References Cited

U.S. PATENT DOCUMENTS 8,184,923 B2 * 5/2012 Hayakawa ............. G09G 3/006
382/275

9,805,458 B2 * 10/2017 Parsons ................. G06T 7/0004
2009/0028423 A1 * 1/2009 Sandstrom ........... G01N 21/956
382/149
2012/0314057 A1 * 12/2012 Mokichev ............... G06T 7/001
348/126
2013/0034293 A1 * 2/2013 Xu .......................... G06T 7/001
382/141
2018/0342050 A1 * 11/2018 Fitzgerald ............. G06T 7/0002
2019/0362481 A1 11/2019 Moertelmaier et al.
2023/0194915 A1 * 6/2023 Pixley ................... G06T 7/0004
356/124

FOREIGN PATENT DOCUMENTS

| CN | 110895806 A | 3/2020 |
|---|---|---|
| CN | 111340752 A | 6/2020 |
| CN | 111524101 A | 8/2020 |
| CN | 111813630 A | 10/2020 |

* cited by examiner

FIG. 1

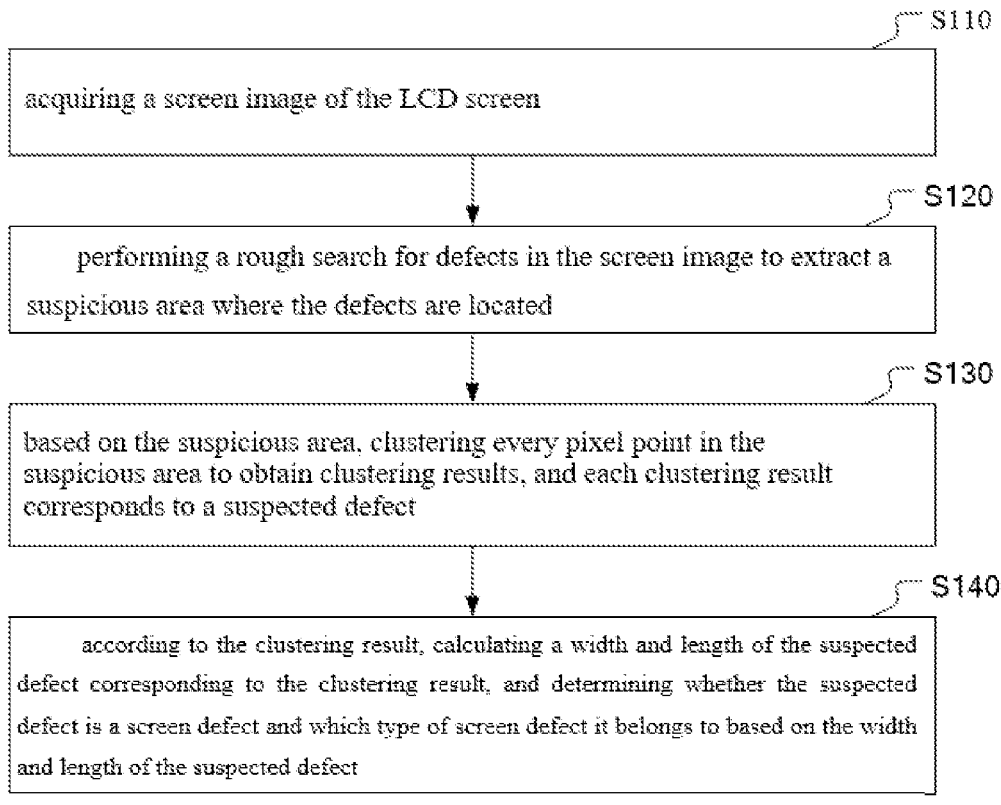

S110 acquiring a screen image of the LCD screen

S120 performing a rough search for defects in the screen image to extract a suspicious area where the defects are located

S130 based on the suspicious area, clustering every pixel point in the suspicious area to obtain clustering results, and each clustering result corresponds to a suspected defect

S140 according to the clustering result, calculating a width and length of the suspected defect corresponding to the clustering result, and determining whether the suspected defect is a screen defect and which type of screen defect it belongs to based on the width and length of the suspected defect

FIG. 2

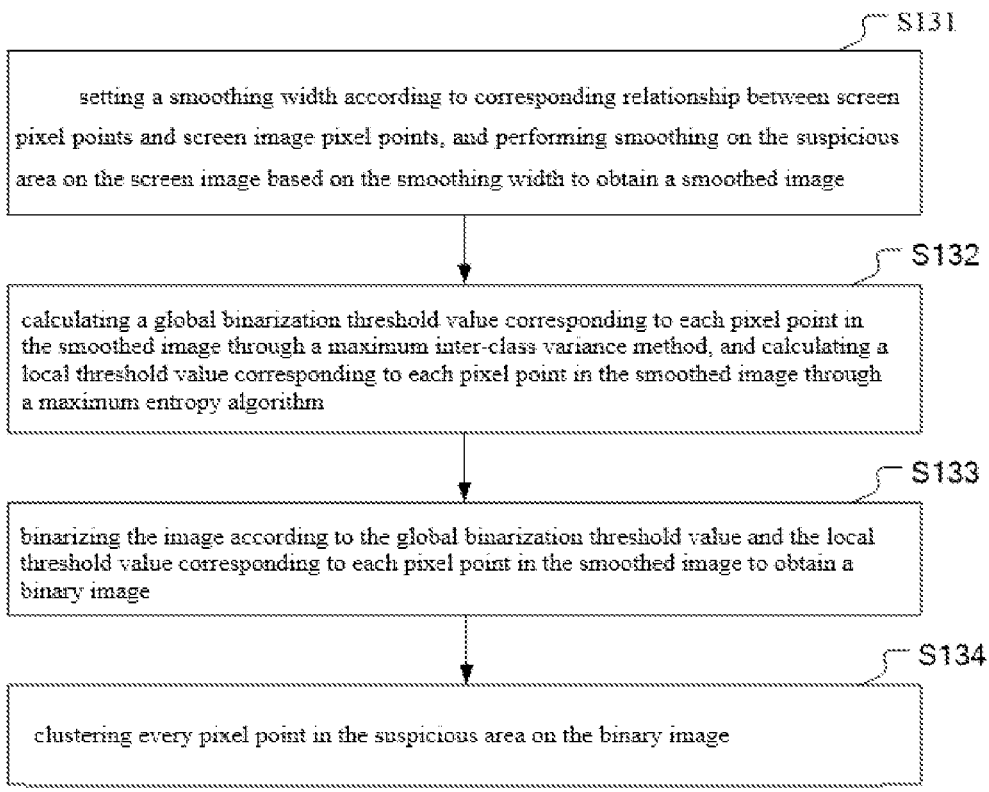

S131 setting a smoothing width according to corresponding relationship between screen pixel points and screen image pixel points, and performing smoothing on the suspicious area on the screen image based on the smoothing width to obtain a smoothed image

S132 calculating a global binarization threshold value corresponding to each pixel point in the smoothed image through a maximum inter-class variance method, and calculating a local threshold value corresponding to each pixel point in the smoothed image through a maximum entropy algorithm

S133 binarizing the image according to the global binarization threshold value and the local threshold value corresponding to each pixel point in the smoothed image to obtain a binary image

S134 clustering every pixel point in the suspicious area on the binary image

DEFECT DETECTION METHOD AND DEVICE FOR AN LCD SCREEN

CROSS-REFERENCE TO RELATED APPLICATIONS

This application is a U.S. National-Stage entry under 35 U.S.C. § 371 based on International Application No. PCT/CN2021/114450, filed Aug. 25, 2021 which was published under PCT Article 21(2) and which claims priority to Chinese Application No. 202010882209.0, filed Aug. 28, 2020, which are all hereby incorporated herein in their entirety by reference.

TECHNICAL FIELD

This application pertains to the field of computer technology, in particular to a defect detection method and device for an LCD screen.

BACKGROUND

The rapid development of mobile technology devices, such as mobile phones, VR (virtual reality) devices, cannot be without display screens. The defect detection of display screen is an essential step in the production. There are various kinds of LCD (liquid crystal display) screen defects, most of which are point defects and linear defects. The position of linear defects is very close to the brightness of the background, so it is very difficult to detect them.

At present, the defect detection is still performed manually in most domestic manufacturers, which has high requirements for operators' eyes. Moreover, long-term manual defect detection will cause great damage to operators' eyes, such as vision injury. In addition, miss inspection of defects will occur when operators are tired due to long-term work, which will increase the probability of defective products entering the market. In addition, other objects, desirable features and characteristics will become apparent from the subsequent summary and detailed description, and the appended claims, taken in conjunction with the accompanying drawings and this background.

SUMMARY

The present disclosure provides a defect detection method and device for an LCD screen to solve or partially solve the above problems.

An aspect of the present disclosure provides a defect detection method for an LCD screen, comprising:

acquiring a screen image of the LCD screen;

performing a rough search for defects in the screen image to extract a suspected area where the defects are located;

(based on the suspected area) clustering every pixel point in the suspected area to obtain clustering results, and each clustering result corresponds to a suspected defect; and (according to the clustering result) calculating a width and length of the suspected defect corresponding to the clustering result, and determining whether the suspected defect is a screen defect and which type of screen defect it belongs to based on the width and length of the suspected defect.

Another aspect of the present disclosure provides a defect detection device for an LCD screen, comprising:

an image acquisition unit for acquiring a screen image of the LCD screen;

a rough defect positioning unit for performing a rough search for defects in the screen image to extract a suspected area where the defects are located;

a clustering unit for, (based on the suspected area) clustering every pixel point in the suspected area to obtain clustering results, and each clustering result corresponds to a suspected defect; and an accurate defect positioning unit for, (according to the clustering result) calculating a width and length of the suspected defect corresponding to the clustering result, and determining whether the suspected defect is a screen defect and which type of screen defect it belongs to based on the width and length of the suspected defect.

Still another aspect of the present disclosure provides a defect detection system for an LCD screen, comprising a camera, a memory and a processor, wherein the camera takes photos of the LCD screen and sends screen images obtained to the processor;

the memory stores computer executable instructions;

the processor executes the above defect detection method for an LCD screen according to the computer executable instructions.

Yet still another aspect of the present disclosure provides a computer readable storage medium on which one or more computer programs are stored. When the one or more computer programs are executed, the above defect detection method for an LCD screen is implemented.

The beneficial effect of the present disclosure is as follows. The embodiments of the present disclosure realize automatic detection of LCD screen defects by rough positioning and accurate positioning of suspected defects, determine whether it is a screen defect according to the width and length of the suspected defect, and determine whether it is a point defect or a linear defect according to the width and length of the defect after determining it is a screen defect, thereby accurately detecting LCD screen defects and defect types.

BRIEF DESCRIPTION OF DRAWINGS

The present invention will hereinafter be described in conjunction with the following drawing figures, wherein like numerals denote like elements, and:

FIG. 1 is a schematic flow diagram of a defect detection method for an LCD screen according to an embodiment of the present disclosure;

FIG. 2 is a schematic diagram of a clustering process according to an embodiment of the present disclosure;

DETAILED DESCRIPTION

Figure 3:
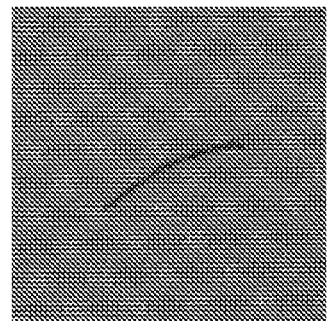
FIG. 3 is a schematic diagram of a screen image of an LCD screen according to an embodiment of the present disclosure.

The following detailed description is merely exemplary in nature and is not intended to limit the invention or the application and uses of the invention. Furthermore, there is no intention to be bound by any theory presented in the preceding background of the invention or the following detailed description.

Exemplary embodiments will be described in detail herein with reference to the accompanying drawings. In the description of the drawings, unless otherwise indicated, the same numeral in different drawings indicates the same or similar element. The implementing modes described in the following exemplary embodiments do not represent all implementing modes consistent with the present disclosure. On the contrary, they are only examples of devices and methods consistent with some aspects of the present disclosure as described in detail in the appended claims.

The terminology used in the present disclosure is for the purpose of describing particular embodiments only and is not intended to limit the present disclosure. As used in the present disclosure and the appended claims, the singular forms "a/an", "said" and "the" are intended to include the plural forms as well, unless the context clearly indicates otherwise. It will also be understood that the term "and/or" as used herein refers to and encompasses any and all possible combinations of one or more of the associated listed items.

It should be understood that, although the terms such as first, second, third may be used in the present disclosure to describe various information, these information should not be limited by these terms. These terms are only used to distinguish the same type of information from each other. For example, without departing from the scope of the present disclosure, the first information may also be called the second information, and similarly, the second information may also be called the first information. Depending on the context, the word "if" as used herein may be interpreted as "when" or "while" or "in response to determining that . . . ".

There are many kinds of LCD (Liquid Crystal Display) screen defects, most of which are point defects and linear defects. Since the position of linear defects is very close to the brightness of the screen background, it is very difficult to detect them. Based on the characteristics of linear defects, the embodiment of the present disclosure proposes a method for effectively detecting linear defects on LCD screens.

Referring to FIG. 1, this method is applied to the defect detection of an LCD screen, and comprises the following steps:

Step S110, acquiring a screen image of the LCD screen;

Step S120, performing a rough search for defects in the screen image to extract a suspected area where the defects are located;

In this step, the screen image may be filtered to generate a difference image based on the filtered image, and the difference image is used to locate the suspected area where the defects are located.

Step S130, (based on the suspected area) clustering every pixel point in the suspected area to obtain clustering results, and each clustering result corresponds to a suspected defect; and Step S140, (according to the clustering result) calculating a width and length of the suspected defect corresponding to the clustering result, and determining whether the suspected defect is a screen defect and which type of screen defect it belongs to based on the width and length of the suspected defect.

As shown in FIG. 1, this embodiment realizes automatic detection of screen defects by rough positioning and accurate positioning of suspected defects, determine whether it is a screen defect according to the width and length of the suspected defect, and determine whether it is a point defect or a linear defect according to the width and length of the defect after determining it is a screen defect, thereby accurately detecting LCD screen defects and defect types.

Taking a screen image of an LCD screen as an example, the implementation steps of the defect detection method for the screen image are described in detail in conjunction with FIGS. 2 to 6.

In the above step S120, the method of extracting the suspected area comprises:

smoothing the screen image as a whole to obtain a first image, and smoothing a background of the screen image to obtain a second image;

calculating a difference between the first image from the second image to obtain a difference image; and performing contour detection on the difference image, and determining an area where a contour is located as the suspected area.

In an embodiment, the screen image may be smoothed twice using a Gaussian filter. The Gaussian filter formula is as follows:

$$G(x, y) = \frac{1}{2\pi\sigma^2} e^{-\frac{x^2+y^2}{2\sigma^2}}$$

In the above formula, G (x, y) is the Gaussian filter function, the parameter $\sigma$ is the width of the Gaussian filter, and (x, y) is coordinates of the pixel point.

It can be seen from the formula that different filters can be generated by setting different $\sigma$. The larger the $\sigma$, the wider the band of the Gaussian filter, and the better the smoothness. Therefore, by setting different $\sigma$, two Gaussian filters can be generated. For example, the value of the parameter $\sigma$ in one Gaussian filter is set to be slightly larger to smooth the whole screen image, and the value of the parameter $\sigma$ in the other Gaussian filter is set to be slightly smaller to smooth the background of the screen image while the defect area of the foreground is not smoothed out. Then a difference image can be obtained by calculating the difference between the two images after filtered. The contour detection is performed on the difference image to find out the suspected contour area, and an area having a preset size is determined with the center of the suspected contour area as the center, for example, a 100*100 area is determined as the suspected area.

Figure 4:
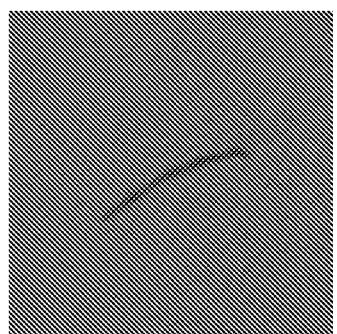
FIG. 4 is a schematic diagram of a screen image after filtered according to an embodiment of the present disclosure.

After determining the suspected area, referring to FIG. 2, the specific process of clustering every pixel point in the suspected region in step S130 above is as follows:

S131, setting a smoothing width according to corresponding relationship between screen pixel points and screen image pixel points, and performing smoothing on the suspected area on the screen image based on the smoothing width to obtain a smoothed image;

As shown in FIG. 3, since the background of the LCD screen is striped and not smooth, the screen image is smoothed before binarization, with the magnification of the screen corresponding to the image as the smooth width. For example, if a pixel point on the LCD screen corresponds to 5*5 pixel points on the screen image captured by the camera, the smooth filtering window is 5*5. Referring to FIG. 4, after the smoothing process, the suspected area in the screen image is relatively smooth, which can avoid the interference of the striped background in the LCD screen to the subsequent suspected defect detection.

S132, calculating a global binarization threshold value corresponding to each pixel point in the smoothed image through a maximum inter-class variance method, and calculating a local threshold value corresponding to each pixel point in the smoothed image through a maximum entropy algorithm;

In this step, the global binarization threshold value T_global (i, j) corresponding to pixel points (i, j) in the smoothed image is calculated by the maximum inter class variance method, and then the local threshold value T_local (i, j) of the pixel point (i, j) is calculated using the maximum entropy algorithm in the 8*8 area centered on the pixel point (i, j).

S133, binarizing the image according to the global binarization threshold value and the local threshold value corresponding to each pixel point in the smoothed image to obtain a binary image;

In this step, the binarization threshold value corresponding to each pixel point is calculated according to the global binarization threshold value and the local threshold value corresponding to each pixel point in the smoothed image. For example, the global binarization threshold value and the local threshold value corresponding to each pixel point are weighted according to a preset weight value, and the result of the weighting process is summed with a preset offset to obtain the binarization threshold value corresponding to each pixel point.

For example, it can be calculated by the following formula:

$$T(i,j)=n\text{Bias}+((1.0\ \text{GlobalLocalBalance})*T\_\text{local}(i,j)+\text{GlobalLocalBalance}*T\_\text{Global})$$

where nBias is the preset offset, GlobalLocalBalance is the preset weight, and T (i, j) is the binarization threshold value corresponding to the pixel point (i, j).

After calculating the binarization threshold value corresponding to each pixel point, each pixel point in the smoothed image is compared with the corresponding binarization threshold value of the pixel point, and a binary image is generated according to the comparison result.

Figure 5:
FIG. 5 is a schematic diagram of a binary image according to an embodiment of the present disclosure.

For example, if the gray value of the pixel point (i, j) in the smoothed image is greater than T (i, j), the gray value of the pixel point (i, j) is set to be the first gray value, for example, 255. On the contrary, if the gray value of the pixel point (i, j) is less than T (i, j), the gray value of the pixel point (i, j) is set to be the second gray value, for example, 0. In this way, the image is binarized, and a binary image as shown in FIG. 5 is obtained.

S134, clustering every pixel point in the suspected area on the binary image.

In this step, all pixel points in the suspected area that meets a clustering condition are clustered, and it is judged whether there are other pixel points in the suspected area that have not been clustered and meet the clustering condition; if there are other pixel points, the other pixel points are clustered until all the pixel points meeting the clustering condition are clustered; if there are no other pixel points, the clustering of pixel points in the suspected area is finished.

The pixel points that meet the clustering condition can be understood as pixel points in the suspected area having a first gray value, the first gray value is the gray value of the pixel points representing defects in the binary image, the gray value of the pixel points representing background in the binary image is a second gray value, and the pixel points having the second gray value are the pixel points that do not meet the clustering condition. Accordingly, all pixel points in the suspected area that meets the clustering condition can be clustered by the following methods: setting a gray value of pixel points representing a defect in the binary image as a first gray value; setting a gray value of pixel points representing a background in the binary image as a second gray value, wherein pixel points having the second gray value are pixel points not meeting the clustering condition; and clustering every pixel point having the first gray value in the suspected area.

For example, if in a binary image, a pixel point having a gray value of 255 is a pixel point having a suspected defect, and a pixel point having a gray value of 0 is a background pixel point, then the pixel point meeting the clustering condition is the pixel point having a gray value of 255, and all pixel points having a gray value of 255 in the suspected area can be clustered. In an embodiment, the clustering process is as follows.

First, for any pixel point $I_j$ on the binary image that meets the clustering condition, it is judged whether adjacent pixel points of the pixel point $I_j$ in the four directions (up, down, left and right) meet the clustering condition one by one, the adjacent pixel points that meet the clustering condition are classified as a first class where the pixel point $I_j$ belongs to, and it is continued to judge whether adjacent pixel points of the adjacent pixel point that meets the clustering condition in the four directions (up, down, left and right) meet the clustering condition, and the clustering of the pixel point $I_j$ is not finished until an adjacent pixel point does not meet the clustering condition, and then the first class is obtained.

Next, the binary image is traversed to judge whether there are pixel points $I'_j$ on the binary image that meet the clustering condition but do not belong to the first class. If there are, the pixel points $I'_j$ are clustered based on the above clustering process until all the pixel points that meet the clustering condition on the binary image have been clustered. If there are not, the clustering process is finished. In this way, the clustering process of pixel points in the suspected area on the binary image is finished.

Figure 6:
FIG. 6 is a schematic diagram of an edge image according to an embodiment of the present disclosure.

After the clustering process is finished, the method for calculating the width and length of the suspected defect in step S140 above is as follows:

First, the suspected defects corresponding to each clustering result are cut out from the screen image to obtain a clipped image corresponding to each suspected defect as shown in FIG. 6.

Figure 7:
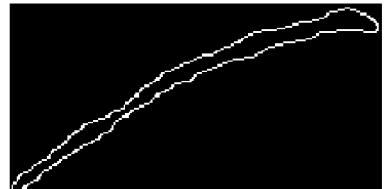
FIG. 7 is a schematic diagram of a profile of a suspected defect in the edge image according to an embodiment of the present disclosure.

Then, the edge detection is performed on the clipped image to obtain an edge image as shown in FIG. 7 for describing the contour of the suspected defect, a first straight line formed by each contour point on the edge image and its adjacent contour points are calculated, and a second straight line perpendicular to the first straight line is calculated based on each contour point.

The edge image is a binary image. The pixel points forming the suspected defect contour in the edge image have a first gray value, and other pixel points have a second gray value.

Suppose that the edge image as shown in FIG. 7 includes n (n is a natural number greater than 1) number of contour points. For the i-th contour point, $i \in (1, 2, \ldots, n)$, the first straight line corresponding to the i-th contour point can be calculated according to a j-th contour point and the i-th contour point. The j-th contour point is the point closest to the i-th contour point. One or more contour points whose distance from the i-th contour point is less than a threshold value may also be determined. The i-th contour point and the one or more contour points are fitted to obtain the first straight line corresponding to the i-th contour point.

After obtaining the first straight line corresponding to the i-th contour point, the line passing through the i-th contour point and perpendicular to the first straight line is calculated as the second straight line corresponding to the i-th contour point.

Thus, each contour point on the edge image correspondingly exists a first straight line and a second straight line.

Then, the length reference value of the suspected defect corresponding to each contour point is calculated based on the first straight line, and the width reference value of the suspected defect corresponding to each contour point is calculated based on the second straight line.

Finally, the length and width of suspected defects are calculated according to the length reference values and width reference values of suspected defects corresponding to each contour point.

In an embodiment, a method for calculating the length reference value of the suspected defect comprises:

for each contour point, calculating a first longest line segment determined by two contour points belonging to the first straight line on the edge image, and taking the first longest line segment as the length reference value of the suspected defect calculated based on the contour point.

In an embodiment, the edge image is traversed, and for the contour point $I_p$ in the edge image, the search is performed in eight adjacent areas with the contour point $I_p$ as the center. When other contour points are found in the eight adjacent areas, for example, one other contour point $I'_p$ is found, the line determined by the contour point $I_p$ and $I'_p$ may be marked as the first straight line, and the distance between any two contour points belonging to the first straight line in the edge image is calculated, and the maximum distance is marked as the length reference value of the suspected defect corresponding to the contour point $I_p$.

The contour point belonging to the first straight line can be understood as the contour point whose distance from the first straight line is within a preset threshold range. For example, a contour point that is 5 units away from the first straight line is marked as the contour point belonging to the first straight line.

The method for calculating the width reference value of the suspected defect comprises:

for each contour point, calculating a second longest line segment determined by the contour point and a contour point belonging to the second straight line on the edge image, and taking the second longest line segment as the width reference value of the suspected defect calculated based on the contour point.

In an embodiment, the line passing through the contour point $I_p$ and perpendicular to the first straight line is taken as the second straight line, the distance between any contour point belonging to the second straight line in the edge image and the contour point $I_p$ is calculated, and the maximum distance is marked as the width reference value of the suspected defect corresponding to the contour point $I_p$.

The contour point belonging to the second straight line can be understood as the contour point whose distance from the second straight line is within a preset threshold range. For example, a contour point that is 5 units away from the second straight line is marked as the contour point belonging to the second straight line.

After calculating the length reference value and the width reference value of the suspected defect corresponding to each contour point, the interference points in the contour points are filtered out to obtain effective contour points; the mean value of the length reference value corresponding to all effective contour points on the edge image is calculated to obtain the length of the suspected defect, and the mean value of the width reference value corresponding to all effective contour points on the edge image is calculated to obtain the width of the suspected defect.

In an embodiment, a slope angle of the second straight line corresponding to each contour point is calculated, a voting is performed on slope angles of the second straight line corresponding to all contour points to screen out such contour points corresponding to the second straight line: the difference between the slope angle of such contour points and a slope angle having the most votes is within a preset angle range, thereby obtaining the effective contour points.

Assuming that the slope angle having the most votes is a and the preset angle range is 5 degrees, such contour points corresponding to the second straight line are screened out: the difference between slope angles of such contour points and a is less than 5 degrees. Such contour points corresponding to the second straight line are effective contour points, wherein a difference between slope angles of such contour points and a is less than 5 degrees.

After calculating the width and length of the suspected defect, the above step S140 of determining whether the suspected defect is a screen defect and which type of screen defect it belongs to, comprises:

judging whether the width and length of the suspected defect meet a screen inspection criterion, and when the inspection criterion is met, not taking the suspected defect as a screen defect, finishing the defect detection of the LCD screen and marking the LCD screen as a qualified product; judging whether the width and length of the suspected defect meet a screen inspection criterion, and when the inspection criterion is not met, taking the suspected defect as a screen defect. At this moment, it may be further judged whether the length of the screen defect is a predetermined multiple of the width (for example, whether the length is 3 or more times of the width); if it is a predetermined multiple of the width, it is determined that the screen defect corresponds to a linear defect when, and if it is not a predetermined multiple of the width, it is determined that the screen defect corresponds to a point defect.

Based on the above methods, this embodiment can automatically detect screen defects, and distinguish linear defects from point defects, and thus achieve better detection results.

Figure 8:
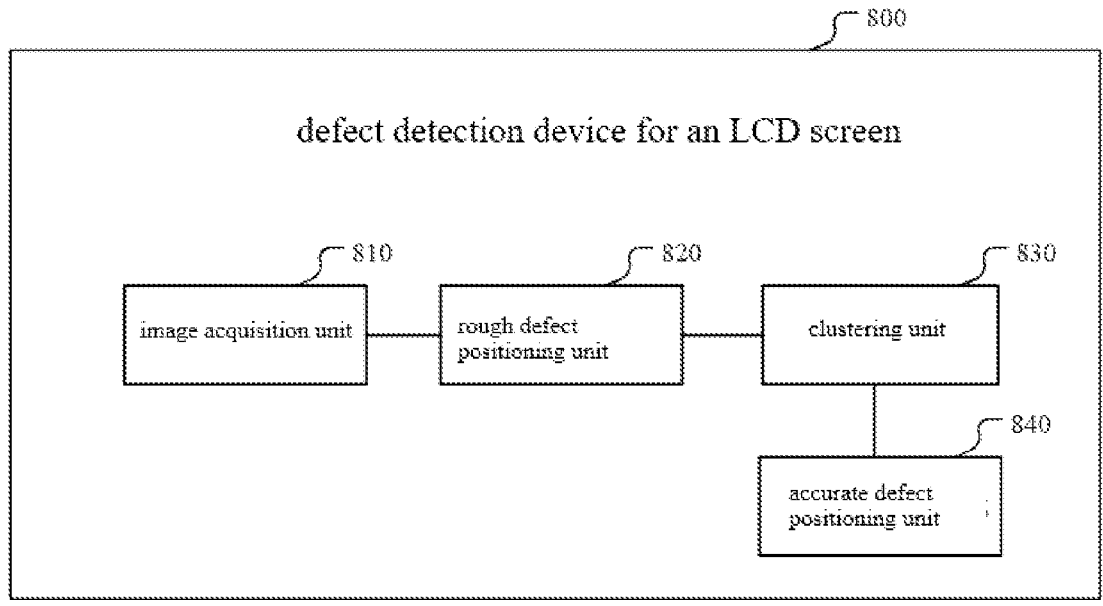
FIG. 8 is a functional block diagram of a defect detection device for an LCD screen according to an embodiment of the present disclosure.

Correspondingly to the above method, the present disclosure also provides a defect detection device for an LCD screen. FIG. 8 is a functional block diagram of a defect detection device for an LCD screen according to an embodiment of the present disclosure. As shown in FIG. 8, the device 800 in this embodiment comprises:

an image acquisition unit 810 for acquiring a screen image of the LCD screen;

a rough defect positioning unit 820 for performing a rough search for defects in the screen image to extract a suspected area where the defects are located;

a clustering unit 830 for (based on the suspected area) clustering every pixel point in the suspected area to obtain clustering results, and each clustering result corresponds to a suspected defect; and an accurate defect positioning unit 840 for (according to the clustering result) calculating a width and length of the suspected defect corresponding to the clustering result, and determining whether the suspected defect is a screen defect and which type of screen defect it belongs to based on the width and length of the suspected defect.

In an embodiment, the accurate defect positioning unit 840 comprises a clipping module, a detection module and a calculation module;

the clipping module is for cutting out the suspected defect corresponding to each clustering result from the screen image to obtain a clipped image corresponding to each suspected defect;

the detection module is for performing edge detection on the clipped image to obtain an edge image; and the calculation module is for calculating a first straight line formed by each contour point on the edge image and its adjacent contour points, calculating a second straight line perpendicular to the first straight line according to each contour point, calculating a length reference value of the suspected defect corresponding to each contour point based on the first straight line, calculating a width reference value of the suspected defect corresponding to each contour point based on the second straight line, and calculating the length and width of the suspected defect according to the length reference value and the width reference value of the suspected defect corresponding to each contour point.

In an embodiment, the calculation module is further for: for each contour point, calculating a first longest line segment determined by two contour points belonging to the first straight line on the edge image, and taking the first longest line segment as the length reference value of the suspected defect calculated based on the contour point; and calculating a second longest line segment determined by the contour point and a contour point belonging to the second straight line on the edge image, and taking the second longest line segment as the width reference value of the suspected defect calculated based on the contour point. In addition, the calculation module is further for: calculating a mean value of length reference values corresponding to all effective contour points on the edge image to obtain the length of the suspected defect, and calculating a mean value of width reference values corresponding to all effective contour points on the edge image to obtain the width of the suspected defect.

The calculation module is further for: calculating a slope angle of the second straight line corresponding to each contour point; and voting on slope angles of the second straight line corresponding to all contour points, screening out such contour points corresponding to the second straight line: the difference between slope angles of such contour points and a slope angle having the most votes is within a preset angle range to obtain the effective contour points.

In an embodiment, the clustering unit 830 comprises a smoothing module, a threshold value calculation module, a binarization module and a clustering module;

the smoothing module is for setting a smoothing width according to corresponding relationship between screen pixel points and screen image pixel points, and performing smoothing on the suspected area on the screen image based on the smoothing width to obtain a smoothed image;

the threshold value calculation module is for calculating a global binarization threshold value corresponding to each pixel point in the smoothed image through a maximum inter-class variance method, and calculating a local threshold value corresponding to each pixel point in the smoothed image through a maximum entropy algorithm;

the binarization module is for binarizing the image according to the global binarization threshold value and the local threshold value corresponding to each pixel point in the smoothed image to obtain a binary image; and the clustering module is for clustering every pixel point in the suspected area on the binary image.

In an embodiment, the clustering unit 830 is further for: clustering every pixel point in the suspected area that meets a clustering condition, and judging whether there are other pixel points in the suspected area that have not been clustered and meet the clustering condition;

if there are other pixel points, clustering the other pixel points until all the pixel points meeting the clustering condition are clustered; and if there are no other pixel points, finishing the clustering of pixel points in the suspected area.

The clustering unit 830 is specifically for: setting a gray value of pixel points representing a defect in the binary image as a first gray value;

setting a gray value of pixel points representing a background in the binary image as a second gray value, wherein pixel points having the second gray value are pixel points not meeting the clustering condition; and clustering every pixel point having the first gray value in the suspected area.

In an embodiment, the defect accurate positioning unit 840 is further for: judging whether the width and length of the suspected defect meet a screen inspection criterion, not taking the suspected defect as a screen defect when the inspection criterion is met, and taking the suspected defect as a screen defect when the inspection criterion is not met; and judging whether the length of the screen defect is a predetermined multiple of the width, determining that the screen defect corresponds to a linear defect if it is a predetermined multiple of the width, and determining that the screen defect corresponds to a point defect if it is not a predetermined multiple of the width.

In an embodiment, the rough defect positioning unit 820 is further for: smoothing the screen image as a whole to obtain a first image, and smoothing a background of the screen image to obtain a second image;

calculating a difference between the first image from the second image to obtain a difference image; and performing contour detection on the difference image, and determining an area where a contour is located as the suspected area.

In sum, this embodiment realizes automatic detection of suspected defects by rough positioning and accurate positioning of suspected defects, determine whether it is a screen defect according to the width and length of the suspected defect, and determine whether it is a point defect or a linear defect according to the width and length of the defect after determining it is a screen defect, thereby accurately detecting LCD screen defects and defect types.

11

It should be noted:

The algorithms and demonstrations given here are not intrinsically associated with any particular computer, virtual system, or other device. All general-purpose system can be used in conjunction with demonstrations here. Based on the above descriptions, architectures for constructing such a system are apparent. In addition, the present disclosure is not dependent on any particular programming language. It is understandable that various programming languages can be used to realize contents of the present disclosure described herein, and that the above descriptions concerning specific languages are intended to reveal the best implementation of the present disclosure.

In the description provided herein, numerous specific details are set forth. However, it can be understood that embodiments of the present disclosure may be practiced without these specific details. In other examples, well-known methods, structures and techniques have not been shown in detail in order not to obscure an understanding of this description.

Similarly, it should be appreciated that in order to simplify the present disclosure and help understand one or more of the various inventive aspects, in the above description of exemplary embodiments of the present disclosure, various features of the present disclosure are sometimes grouped together in a single embodiment, diagram, or description thereof. However, the method disclosed should not be interpreted as reflecting an intention that the claimed present disclosure requires more features than those expressly recited in each claim. More exactly, as the following claims reflect, inventive aspects include features less than all features of a single foregoing disclosed embodiment. Thus, the claims following the detailed description are hereby expressly incorporated into this detailed description, with each claim being an independent embodiment of the present disclosure.

Those skilled in the art can understand that it is possible to adaptively change the modules in the device in the embodiments and set them in one or more devices different from the embodiments. The modules or units or components in the embodiments can be combined into one module or unit or component, and in addition, they can be divided into multiple sub-modules or sub-units or sub-components. Except that at least some of such features and/or processes or units are mutually exclusive, any combination can be used to combine all features disclosed in this specification (including the accompanying claims, abstract and drawings) and all processes or units of any method or device disclosed in such a way. Unless expressly stated otherwise, each feature disclosed in this specification (including the accompanying claims, abstract and drawings) may be replaced by an alternative feature providing the same, equivalent or similar purpose.

In addition, those skilled in the art can understand that although some embodiments described herein include some but not other features included in other embodiments, combinations of features of different embodiments are meant to be within the scope of the present disclosure, and form different embodiments, as would be understood by those in the art. For example, in the following claims, any of the claimed embodiments can be used in any combination.

The various component embodiments of the present disclosure may be implemented by hardware, or by software modules running on one or more processors, or by their combination. Those skilled in the art should understand that a microprocessor or a digital signal processor (DSP) can be used in practice to implement some or all functions of some or all the components of the defect detection device for an LCD screen according to the embodiments of the present disclosure. The present disclosure can also be implemented as a device or device program (for example, a computer program and a computer program product) for executing part or all of the methods described herein. Such a program for realizing the present disclosure may be stored on a computer readable medium, or may have the form of one or more signals. Such signals can be downloaded from Internet websites, or provided on carrier signals, or provided in any other form.

Figure 9:
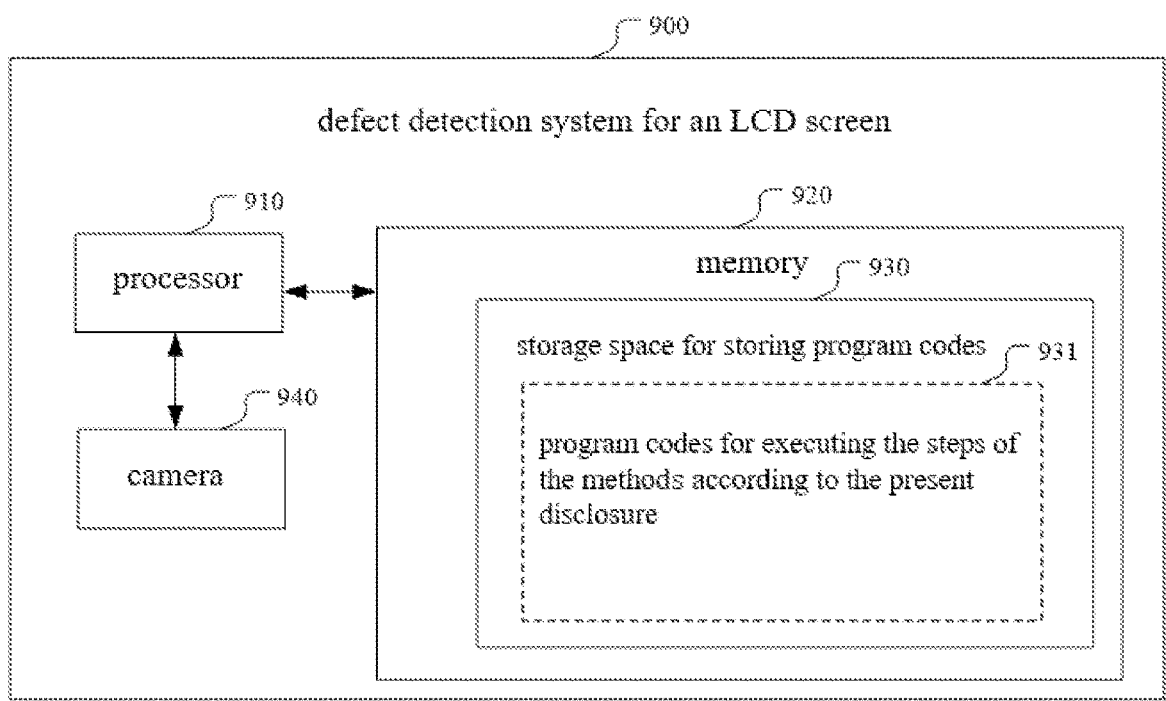
FIG. 9 is a structural block diagram of a defect detection system for an LCD screen according to an embodiment of the present disclosure.

For example, FIG. 9 is a schematic diagram of the structure of a defect detection system for an LCD screen according to an embodiment of the present disclosure. The defect detection system 900 includes a camera 940, a processor 910, and a memory 920 configured to store computer executable instructions (computer readable program code). The memory 920 may be an electronic memory such as a flash memory, an EEPROM (electrically erasable programmable read only memory), an EPROM, a hard disk, or a ROM. The memory 920 has a storage space 930 that stores computer readable program codes 931 for executing any steps of the methods described above. For example, the storage space 930 for storing the computer readable program codes may include individual computer readable program codes 931 for implementing various steps in the above method embodiment. The computer readable program code 931 may be read from or written to one or more computer program products. These computer program products include program code carriers such as hard disks, compact discs (CDs), memory cards, or floppy disks. Such a computer program product is typically a computer readable storage medium as shown in, for example, FIG. 10.

Specifically, the processor 910 may executes the following defect detection method for an LCD screen according to computer executable instructions:

acquiring a screen image of the LCD screen;

performing a rough search for defects in the screen image to extract a suspected area where the defects are located;

(based on the suspected area) clustering every pixel point in the suspected area to obtain clustering results, and each clustering result corresponds to a suspected defect; and (according to the clustering result) calculating a width and length of the suspected defect corresponding to the clustering result, and determining whether the suspected defect is a screen defect and which type of screen defect it belongs to based on the width and length of the suspected defect.

The processor 910 further executes the following defect detection method for an LCD screen according to computer executable instructions:

cutting out the suspected defect corresponding to each clustering result from the screen image to obtain a clipped image corresponding to each suspected defect;

performing edge detection on the clipped image to obtain an edge image, calculating a first straight line formed by each contour point on the edge image and its adjacent contour points, and calculating a second straight line perpendicular to the first straight line according to each contour point;

calculating a length reference value of the suspected defect corresponding to each contour point based on the first straight line, and calculating a width reference value of the suspected defect corresponding to each contour point based on the second straight line; and calculating the length and width of the suspected defect according to the length reference value and the width reference value of the suspected defect corresponding to each contour point.

The processor 910 further executes the following defect detection method for an LCD screen according to computer executable instructions:

setting a smoothing width according to corresponding relationship between screen pixel points and screen image pixel points, and performing smoothing on the suspected area on the screen image based on the smoothing width to obtain a smoothed image;

calculating a global binarization threshold value corresponding to each pixel point in the smoothed image through a maximum inter-class variance method, and calculating a local threshold value corresponding to each pixel point in the smoothed image through a maximum entropy algorithm;

binarizing the image according to the global binarization threshold value and the local threshold value corresponding to each pixel point in the smoothed image to obtain a binary image; and clustering every pixel point in the suspected area on the binary image.

The processor 910 further executes the following defect detection method for an LCD screen according to computer executable instructions:

judging whether the width and length of the suspected defect meet a screen inspection criterion, not taking the suspected defect as a screen defect when the inspection criterion is met, and taking the suspected defect as a screen defect when the inspection criterion is not met; and judging whether the length of the screen defect is a predetermined multiple of the width, determining that the screen defect corresponds to a linear defect if it is a predetermined multiple of the width, and determining that the screen defect corresponds to a point defect if it is not a predetermined multiple of the width.

As for other functions that the processor 910 can realize, please refer to the specific contents of the above method embodiments, which will not be repeated here.

Figure 10:
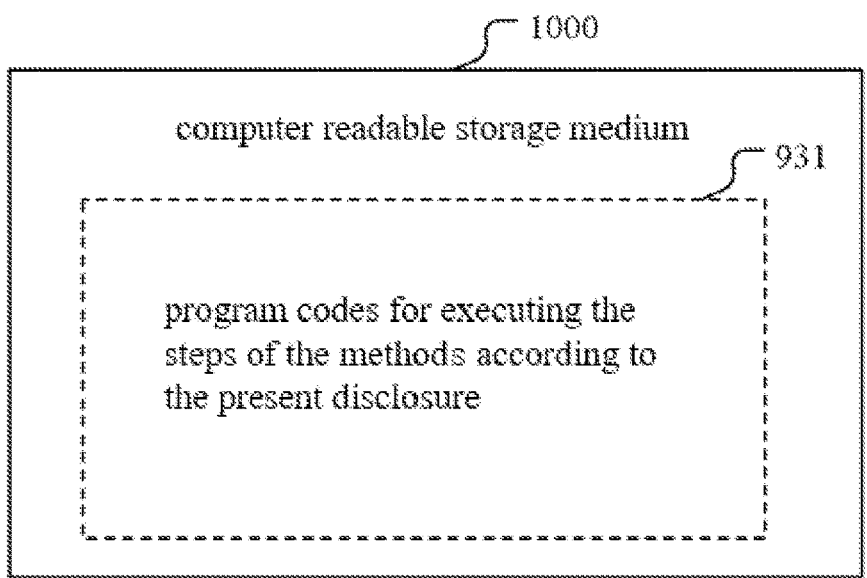
FIG. 10 is a schematic diagram of the structure of a computer readable storage medium according to an embodiment of the present disclosure.

FIG. 10 is a schematic diagram of the structure of a computer readable storage medium according to an embodiment of the present disclosure. The computer readable storage medium 1000 stores the computer readable program codes 931 for executing steps of the methods according to the present disclosure, which can be read by the processor 910 of the defect detection system 900. When the computer readable program codes 931 are run by the defect detection system 900, the defect detection system 900 executes various steps of the methods described above. Specifically, the computer readable program code 931 stored in the computer readable storage medium can execute the method shown in any of the above embodiments, which will not be repeated here. The computer readable program code 931 may be compressed in an appropriate form.

It should be noted that the above embodiments illustrate rather than limit the present disclosure, and those skilled in the art can design alternative embodiments without departing from the scope of the appended claims. In the claims, any reference signs placed between parentheses should not be construed as a limitation to the claims. The word "comprising" does not exclude the presence of elements or steps not listed in the claims. The word "a" or "an" preceding an element does not exclude the presence of multiple such elements. The present disclosure can be implemented by means of hardware comprising several different elements and by means of a suitably programmed computer. In the unit claims enumerating several devices, several of these devices may be embodied in the same hardware item. The use of the words "first", "second", "third" and the like does not indicate any order. These words can be interpreted as names.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A defect detection method for an LCD screen, comprising:

acquiring a screen image of the LCD screen;

performing a rough search for defects in the screen image to extract a suspected area where the defects are located;

based on the suspected area, clustering every pixel point in the suspected area to obtain clustering results, and each clustering result corresponds to a suspected defect; and according to the clustering result, calculating a width and length of the suspected defect corresponding to the clustering result, and determining whether the suspected defect is a screen defect and which type of screen defect it belongs to based on the width and length of the suspected defect, wherein according to the clustering result, calculating a width and length of the suspected defect corresponding to the clustering result comprises:

cutting out the suspected defect corresponding to each clustering result from the screen image to obtain a clipped image corresponding to each suspected defect;

performing edge detection on the clipped image to obtain an edge image, calculating a first straight line formed by each contour point on the edge image and its adjacent contour points, and calculating a second straight line perpendicular to the first straight line according to each contour point;

calculating a length reference value of the suspected defect corresponding to each contour point based on the first straight line, and calculating a width reference value of the suspected defect corresponding to each contour point based on the second straight line; and calculating the length and width of the suspected defect according to the length reference value and the width reference value of the suspected defect corresponding to each contour point, wherein determining whether the suspected defect is a screen defect and which type of screen defect it belongs to based on the width and length of the suspected defect comprises:

judging whether the width and length of the suspected defect meet a screen inspection criterion, not taking the suspected defect as a screen defect when the inspection criterion is met, and detecting the suspected defect as a screen defect when the inspection criterion is not met;

judging whether the length of the screen defect is a predetermined multiple of the width, detecting the screen defect as a linear defect if it is a predetermined multiple of the width, and detecting the screen defect as a point defect if it is not a predetermined multiple of the width.

2. The method according to claim 1, wherein calculating a length reference value of the suspected defect corresponding to each contour point based on the first straight line, and calculating a width reference value of the suspected defect corresponding to each contour point based on the second straight line comprises:

for each contour point, calculating a first longest line segment determined by two contour points belonging to the first straight line on the edge image, and taking the first longest line segment as the length reference value of the suspected defect calculated based on the contour point; and calculating a second longest line segment determined by the contour point and a contour point belonging to the second straight line on the edge image, and taking the second longest line segment as the width reference value of the suspected defect calculated based on the contour point;

calculating the length and width of the suspected defect according to the length reference value and the width reference value of the suspected defect corresponding to each contour point comprises:

filtering out interference points in the contour points to obtain effective contour points; and calculating a mean value of length reference values corresponding to all effective contour points on the edge image to obtain the length of the suspected defect, and calculating a mean value of width reference values corresponding to all effective contour points on the edge image to obtain the width of the suspected defect.

3. The method according to claim 2, wherein filtering out interference points in the contour points to obtain effective contour points comprises:

calculating a slope angle of the second straight line corresponding to each contour point; and voting on slope angles of the second straight line corresponding to all contour points, screening out such contour points corresponding to the second straight lines: a difference between slope angles of such contour points and a slope angle having the most votes is within a preset angle range to obtain the effective contour points.

4. The method according to claim 1, wherein based on the suspected area, clustering every pixel point in the suspected area comprises:

setting a smoothing width according to corresponding relationship between screen pixel points and screen image pixel points, and performing smoothing on the suspected area on the screen image based on the smoothing width to obtain a smoothed image;

calculating a global binarization threshold value corresponding to each pixel point in the smoothed image through a maximum inter-class variance method, and calculating a local threshold value corresponding to each pixel point in the smoothed image through a maximum entropy algorithm;

binarizing the image according to the global binarization threshold value and the local threshold value corresponding to each pixel point in the smoothed image to obtain a binary image; and clustering every pixel point in the suspected area on the binary image.

5. The method according to claim 1, wherein based on the suspected area, clustering every pixel point in the suspected area comprises:

clustering every pixel point in the suspected area that meets a clustering condition, and judging whether there are other pixel points in the suspected area that have not been clustered and meet the clustering condition;

if there are other pixel points, clustering the other pixel points until all the pixel points meeting the clustering condition are clustered; and if there are no other pixel points, finishing the clustering of pixel points in the suspected area.

6. The method according to claim 5, wherein, clustering every pixel point meeting the clustering condition in the suspected area comprises:

setting a gray value of pixel points representing a defect in the binary image as a first gray value;

setting a gray value of pixel points representing a background in the binary image as a second gray value, wherein pixel points having the second gray value are pixel points not meeting the clustering condition; and clustering every pixel point having the first gray value in the suspected area.

7. The method according to claim 1, wherein performing a rough search for defects in the screen image to extract a suspected area where the defects are located comprises:

smoothing the screen image as a whole to obtain a first image, and smoothing a background of the screen image to obtain a second image;

calculating a difference between the first image from the second image to obtain a difference image; and performing contour detection on the difference image, and determining an area where a contour is located as the suspected area.

8. A defect detection device for an LCD screen, comprising:

a camera; and a processor, wherein the camera requires a screen image of the LCD screen;

wherein the processor implements the following processing:

performing a rough search for defects in the screen image to extract a suspected area where the defects are located;

based on the suspected area, clustering every pixel point in the suspected area to obtain clustering results, and each clustering result corresponds to a suspected defect;

cutting out the suspected defect corresponding to each clustering result from the screen image to obtain a clipped image corresponding to each suspected defect;

performing edge detection on the clipped image to obtain an edge image; and calculating a first straight line formed by each contour point on the edge image and its adjacent contour points, calculating a second straight line perpendicular to the first straight line according to each contour point, calculating a length reference value of the suspected defect corresponding to each contour point based on the first straight line, calculating a width reference value of the suspected defect corresponding to each contour point based on the second straight line, and calculating the length and width of the suspected defect according to the length reference value and the width reference value of the suspected defect corresponding to each contour point, determining whether the suspected defect is a screen defect and which type of screen defect it belongs to based on the width and length of the suspected defect.

\* \* \* \* \*